United States Patent [19]
DeVore et al.

[11] Patent Number: 5,967,005
[45] Date of Patent: Oct. 19, 1999

[54] TIRE CHANGING AID

[76] Inventors: Marvin R. DeVore; Sandra K. DeVore, both of 6215 Bois D'Arc, Richmond, Tex. 77469

[21] Appl. No.: 09/001,724

[22] Filed: Dec. 31, 1997

[51] Int. Cl.[6] .................................................. B25B 23/00
[52] U.S. Cl. ............................................. 81/462; 81/180.1
[58] Field of Search ..................................... 81/180.1, 462

[56] References Cited

U.S. PATENT DOCUMENTS 2,960,895  11/1960  Richards ..................................... 81/462

FOREIGN PATENT DOCUMENTS 2517934  11/1976  Germany .................................. 81/462

Primary Examiner—James G. Smith

[57] ABSTRACT

A new tire changing aid for allowing a person who has a flat tire to apply added leverage when removing lug nuts. The inventive device includes three legs each having upper ends and lower ends. The upper ends of the three legs are hingedly coupled together. The lower ends of the three legs are extendable outwardly to form a tripod support. A plurality of support arms extend outwardly from one of the three arms in a linear arrangement. Distal ends of each of the support arms have a disk disposed thereon.

6 Claims, 2 Drawing Sheets

TIRE CHANGING AID

BACKGROUND OF THE INVENTION

1. Field of the Invention

The present invention relates to tripod devices and more particularly pertains to a new tire changing aid for allowing a person who has a flat tire to apply added leverage when removing lug nuts.

2. Description of the Prior Art

The use of tripod devices is known in the prior art. More specifically, tripod devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art tripod devices include U. S. Pat. No. 4,691,832 to Steiger; U.S. Pat. No. 4,152,834 to Stansberry; U.S. Pat. No. Des. 356,907 to Jernigan; U.S. Pat. No. 5,016,300 to Jandrakovic; U.S. Pat. No. 4,296,509 to Simmons et al.; and U.S. Pat. No. 3,170,418 to Gruenstein.

While these devices fulfill their respective, particular objectives and requirements, the aforementioned patents do not disclose a new tire changing aid. The inventive device includes three legs each having upper ends and lower ends. The upper ends of the three legs are hingedly coupled together. The lower ends of the three legs are extendable outwardly to form a tripod support. A plurality of support arms extend outwardly from one of the three arms in a linear arrangement. Distal ends of each of the support arms have a disk disposed thereon.

In these respects, the tire changing aid according to the present invention substantially departs from the conventional concepts and designs of the prior art, and in so doing provides an apparatus primarily developed for the purpose of allowing a person who has a flat tire to apply added leverage when removing lug nuts.

SUMMARY OF THE INVENTION

In view of the foregoing disadvantages inherent in the known types of tripod devices now present in the prior art, the present invention provides a new tire changing aid construction wherein the same can be utilized for allowing a person who has a flat tire to apply added leverage when removing lug nuts.

The general purpose of the present invention, which will be described subsequently in greater detail, is to provide a new tire changing aid apparatus and method which has many of the advantages of the tripod devices mentioned heretofore and many novel features that result in a new tire changing aid which is not anticipated, rendered obvious, suggested, or even implied by any of the prior art tripod devices, either alone or in any combination thereof.

To attain this, the present invention generally comprises three legs each having upper ends and lower ends. The upper ends of the three legs are hingedly coupled together. The lower ends each have a circular base secured thereto. The lower ends of the three legs are extendable outwardly to form a tripod support. Three chains extend between the three legs upwardly of the lower ends thereof. The three chains limit the outward extension of the three legs. A plurality of support arms extend outwardly from one of the three arms in a linear arrangement. Distal ends of each of the support arms have a disk disposed thereon. The disks have a diameter about twice as great as a diameter of the support arms. A carrying case is dimensioned for receiving the three legs therein a folded orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tire changing aid apparatus and method which has many of the advantages of the tripod devices mentioned heretofore and many novel features that result in a new tire changing aid which is not anticipated, rendered obvious, suggested, or even implied by any of the prior art tripod devices, either alone or in any combination thereof.

It is another object of the present invention to provide a new tire changing aid which may be easily and efficiently manufactured and marketed.

It is a further object of the present invention to provide a new tire changing aid which is of a durable and reliable construction.

An even further object of the present invention is to provide a new tire changing aid which is susceptible of a low cost of manufacture with regard to both materials and labor, and which accordingly is then susceptible of low prices of sale to the consuming public, thereby making such tire changing aid economically available to the buying public.

Still yet another object of the present invention is to provide a new tire changing aid which provides in the apparatuses and methods of the prior art some of the advantages thereof, while simultaneously overcoming some of the disadvantages normally associated therewith.

Still another object of the present invention is to provide a new tire changing aid for allowing a person who has a flat tire to apply added leverage when removing lug nuts.

Yet another object of the present invention is to provide a new tire changing aid which includes three legs each having upper ends and lower ends. The upper ends of the three legs are hingedly coupled together. The lower ends of the three legs are extendable outwardly to form a tripod support. A plurality of support arms extend outwardly from one of the three arms in a linear arrangement. Distal ends of each of the support arms have a disk disposed thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
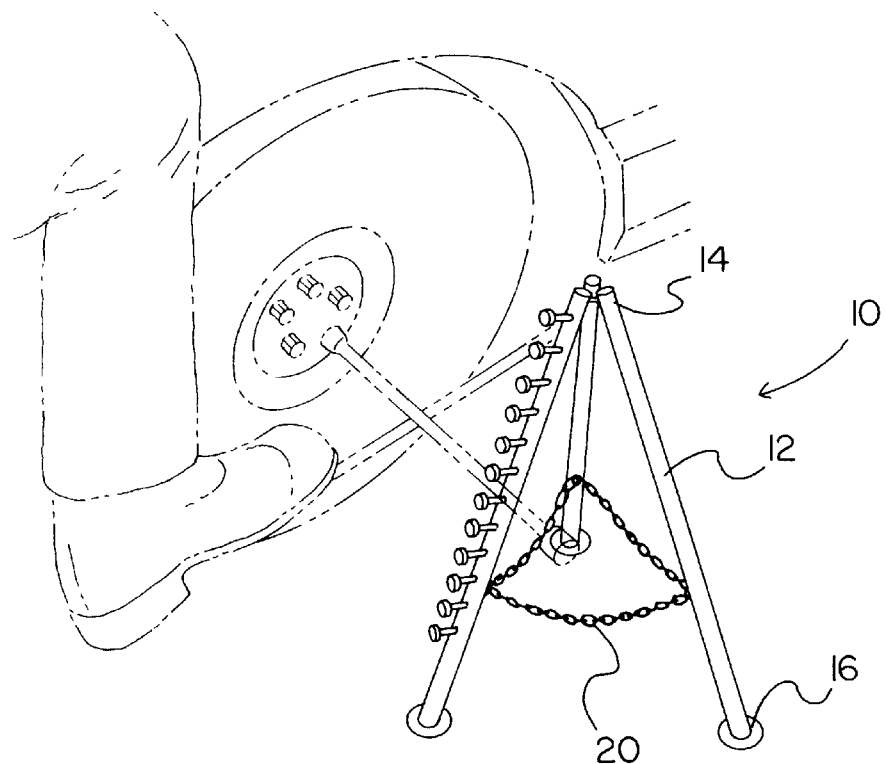
FIG. 1 is a perspective view of a new tire changing aid according to the present invention illustrated in use.
Figure 2:
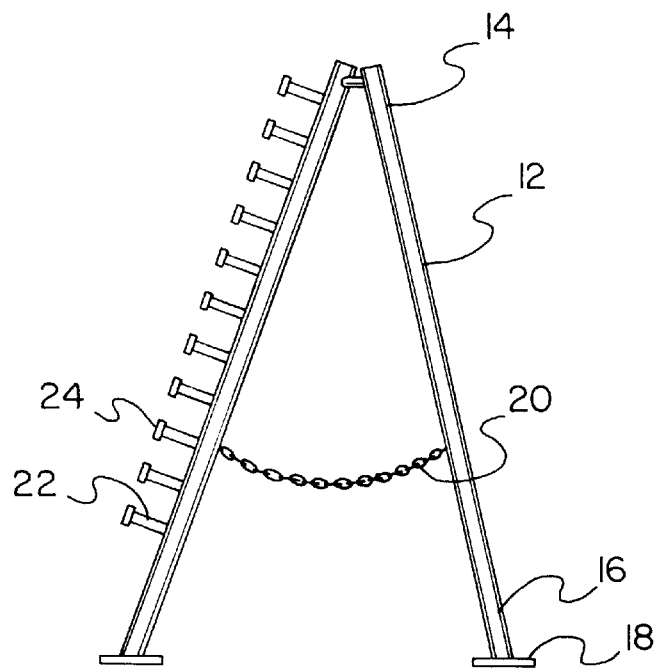
FIG. 2 is a side view of the present invention illustrated in an extended orientation.
Figure 3:
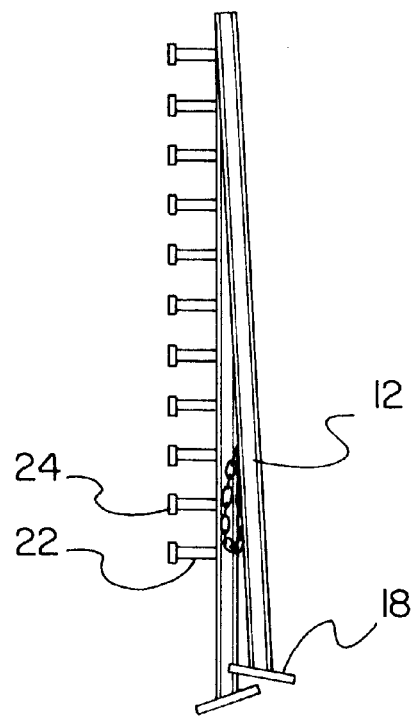
FIG. 3 is a side view of the present invention illustrated in a folded orientation.
Figure 4:
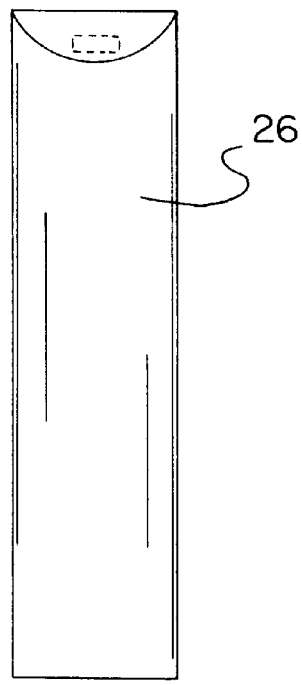
FIG. 4 is an isometric view of a carrying case of the present invention.

With reference now to the drawings, and in particular to FIGS. 1 through 4 thereof, a new tire changing aid embodying the principles and concepts of the present invention and generally designated by the reference numeral 10 will be described.

As best illustrated in FIGS. 1 through 4, the tire changing aid 10 comprises three legs 12 each having upper ends 14 and lower ends 16. The upper ends 14 of the three legs 12 are hingedly coupled together. The lower ends 16 each have a circular base 18 secured thereto. The lower ends 16 of the three legs 12 are extendable outwardly to form a tripod support.

Three chains 20 extend between the three legs 12 upwardly of the lower ends 16 thereof. The three chains 20 limit the outward extension of the three legs 12.

A plurality of support arms 22 extend outwardly from one of the three arms 12 in a linear arrangement. Distal ends of each of the support arms 22 have a disk 24 disposed thereon. The disks 24 have a diameter about twice as great as a diameter of the support arms 22.

A carrying case 26 is dimensioned for receiving the three legs 12 therein a folded orientation.

In use, the present invention allows a person to exert a great amount of leverage when trying to remove very tight or stuck nuts from the wheel of a vehicle. A person would place a regular four way lug wrench on the first lug being removed, much as normal. However, he would be sure that the wrench was as close to being in a horizontal plane as possible. Then, the present invention would be set up at the end of the wrench opposite the arm that was in place on the lug, with the wrench being supported on one of the support arms 22 one the one leg. The user would support the wrench on the support arm 22 that would keep the wrench in the most horizontal position. The user could stand next the vehicle and brace himself with one hand, while lifting one foot and placing it on one of the unsupported arms of the lug wrench. Exerting pressure with the leg would force the arm of the wrench downward, rotating the wrench and breaking the lug free.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A new tire changing aid for allowing a person who has a flat tire to apply added leverage when removing lug nuts comprising, in combination:

three legs each having upper ends and lower ends, the upper ends of the three legs being hingedly coupled together, the lower ends each having a circular base secured thereto, the lower ends of the three legs being extendable outwardly to form a tripod support;

three chains extending between the three legs upwardly of the lower ends thereof, the three chains limiting the outward extension of the three legs;

a plurality of support arms extending outwardly from one of the three arms in a linear arrangement, distal ends of each of the support arms having a disk disposed thereon, the disks having a diameter about twice as great as a diameter of the support arms; and a carrying case dimensioned for receiving the three legs therein a folded orientation.

2. A new tire changing aid for allowing a person who has a flat tire to apply added leverage when removing lug nuts comprising, in combination:

three legs each having upper ends and lower ends, the upper ends of the three legs being hingedly coupled together, the lower ends of the three legs being extendable outwardly to form a tripod support;

a plurality of support arms extending outwardly from one of the three arms in a linear arrangement, distal ends of each of the support arms having a disk disposed thereon.

3. The tire changing aid as set forth in claim 2 wherein the lower ends of each leg has a circular base secured thereto.

4. The tire changing aid as set forth in claim 2 and further including three chains extending between the three legs upwardly of the lower ends thereof, the three chains limiting the outward extension of the three legs.

5. The tire changing aid as set forth in claim 2 wherein the the disks have a diameter about twice as great as a diameter of the support arms.

6. The tire changing aid as set forth in claim 2 and further including a carrying case dimensioned for receiving the three legs therein a folded orientation.

\* \* \* \* \*